(No Model.)
F. MANKEY.
PROCESS OF MAKING ORNAMENTAL CORNER MOLDINGS.
No. 342,025. Patented May 18, 1886.
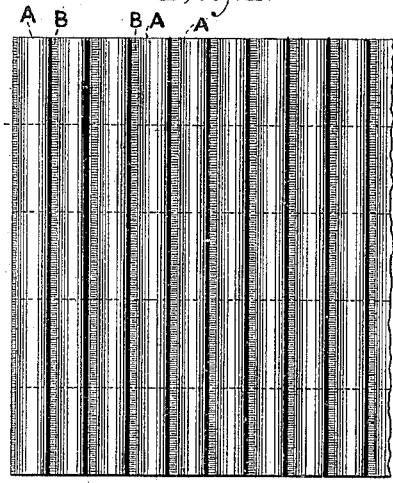
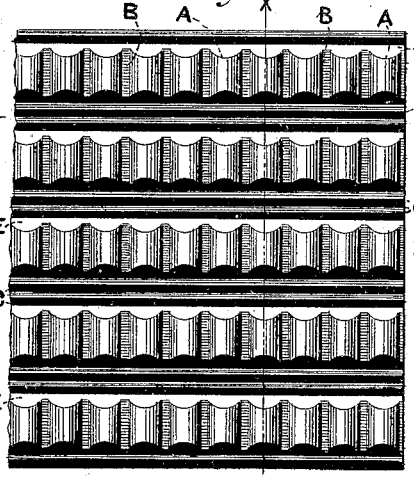
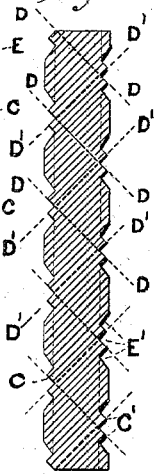
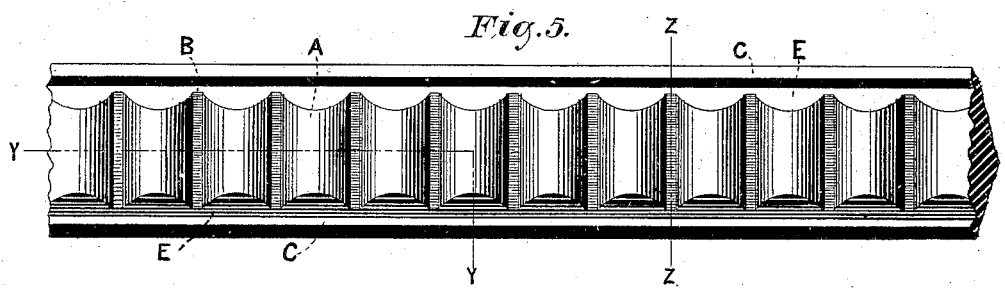
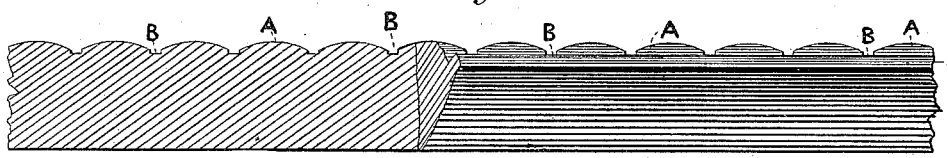
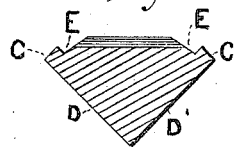
WITNESSES
Gustave Dieterich
Fred Huetwohl
INVENTOR
F. Mankey
By Hollingsworth & Maley
Attorneys.
N. PETERS, Photo-Lithographer, Washington, D. C.

UNITED STATES PATENT OFFICE.

FREDERICK MANKEY, OF WILLIAMSPORT, PENNSYLVANIA.

PROCESS OF MAKING ORNAMENTAL CORNER-MOLDINGS.

SPECIFICATION forming part of Letters Patent No. 342,025, dated May 18, 1886.

Application filed August 25, 1885. Serial No. 175,286. (No model.)

*To all whom it may concern:*

Be it known that I, FREDERICK MANKEY, of Williamsport, Lycoming county, Pennsylvania, have invented a new and useful Process of Making Ornamental Corner-Moldings.

The following is a specification of my said improvements, reference being had to the accompanying drawings, in which—

Figure 1 is a top or plan view of a board which has been subjected to the first step of my process. Fig. 2 is a side edge view of the same. Fig. 3 is a top or plan view; and Fig. 4 a transverse section on the line X X of Fig. 3, showing the board after it has been subjected to a second step, which I prefer to use in said process. Fig. 5 is a top view, Fig. 6 a side view, partly in longitudinal section, and Fig. 7 a transverse section, of a finished molding made by my process, the scale of these last three figures being somewhat enlarged.

The moldings for the production of which my process is intended are corner or angle moldings, such as can be accurately applied along the junction of two plane surfaces intersecting one another at right angles.

The object of my process is to make a molding having highly-ornamental surface with the greatest economy of material, and by a simple and cheap mode of treatment.

I take a board of any desired length and of such width as to give a number of the strips of the finished molding, and I subject this board, in the first instance, to the action of cutters, preferably rotary, by means of which I form across both surfaces of the board, and in a direction preferably at right angles to the grain thereof, a series of channels, B, and intermediate raised ridges, A. In the instance shown in the drawings the ridges have a curved cross-section and the channels a rectangular one, as shown in Fig. 2, which represents a side or edge view of the board after it has been cut on both sides in the manner described. The form and arrangement of the cuts may of course be greatly varied, but may be comprehended under the general term of "surface cross-cutting." This constitutes the first step of the process. I then prefer to further ornament the molding by longitudinal surface-cutting, so as, for instance, to give at symmetrical intervals a series of longitudinal grooves, E, and ridges C. The form and arrangement of these may of course be varied, as before stated, the particular type selected in the present case being of angular cross-section, as shown in the sectional view of Fig. 4. When this longitudinal surface-cutting is used, I subject both sides of the board thereto; but instead of the cuts upon the one side being opposite to those on the other they are alternated, as shown in Fig. 4, those upon one side being represented by E C, respectively, and those upon the other by E' C', respectively. This constitutes a preferred second step of my process. I then divide the board longitudinally in the diagonal planes D D D' D', (shown in the dotted lines of Fig. 4,) thus separating it into a number of strips of the appearance shown in Figs. 5, 6, and 7, the molded surface of each strip being ornamented by both cross and longitudinal surface-cutting, and the back of each strip having the cross-section shown in Fig. 7, which enables it to be fitted snugly along the rectangular joint of two boards. This diagonal cutting constitutes the final step of my process.

By reference to Fig. 4 it will be seen that by cutting in the planes B B and B' B' perpendicular to one another, but at an angle of forty-five degrees to the board itself, I obtain the greatest possible number of strips from a given amount of material, since the molded surfaces alternate upon the opposite sides thereof, and there is no waste, such as would necessarily occur if the board were cut in planes perpendicular to its surface.

I prefer to apply both cross and longitudinal surface cutting to ornament the molding, but do not limit my claim to the combination of both as necessary steps of the process, since a less ornamental molding can be obtained by cross-cutting alone.

Having thus described my invention, I claim—

1. The hereinbefore-described process of making angle-moldings, which consists in, first, surface cross-cutting a board in any desired pattern and upon both sides, and, second, dividing said board into strips by cutting it longitudinally in diagonal planes, substantially as described.

2. The hereinbefore-described process of making angle-moldings, which consists in, first, surface cross-cutting a board on both sides in any desired pattern; second, surface-cutting said board longitudinally in any desired pattern, and at such intervals that the longitudinal cuts upon one side shall alternate with those upon the other, and, third, dividing said board into strips by cutting it longitudinally in diagonal planes, substantially in the manner described.

FREDERICK MANKEY.

Witnesses:
ADDISON CANDOR,
GEO. L. SANDERSON.